Patented Sept. 5, 1939

2,172,301

UNITED STATES PATENT OFFICE 2,172,301

PROCESS OF PRODUCING A PRODUCT HAVING CATION-EXCHANGING PROPERTIES FROM LIGNITE OR PEAT

Walther Sütterlin, Bitterfeld, and Hans Wassenegger, Dessau in Anhalt, Germany, assignors to I. G. Farbenindustrie Aktiengesellschaft, Frankfort-on-the-Main, Germany No Drawing. Application July 9, 1937, Serial No. 152,785. In Germany July 14, 1936

7 Claims. (Cl. 252—2)

Our present invention relates to a new process for preparing cation-exchanging bodies and more particularly to an improvement of the cation-exchanging properties of lignite and peat.

It is well known in the art that lignite and peat exhibit base-exchanging properties. The capacity of these products, however, is very poor, even if they are purified by a treatment with alkalies or acids. In order to improve their activity, a sulfonation of coals containing lignitic compounds has been suggested. This process involves, however, a great loss on sulfuric acid. Furthermore, such products have an undesired fine grain and an insufficient stability against neutral and alkaline liquors.

Now, we have found that these disadvantages may be avoided by treating materials containing humic acids, such as lignite or peat, with a water-soluble bisulfite salt or a mixture of such a bisulfite and a sulfite. In order to hinder peptization of the lignite or peat it is advantageous to avoid a too strong alkalinity of the treating liquor. This is easily done by a suitable adjustment of the sulfite and bisulfite introduced into the reaction mixture. The lignite or peat disintegrated to the desired size of grains may be pretreated with steam, acids, or alkalies, in order to remove inactive impurities. Preferably this treatment with an aldehyde in the presence of a sulfite or bisulfite respectively, is carried out in a closed vessel at a temperature up to about 200° C.

The examples following hereafter serve to illustrate our invention, the parts being by weight:

*Example 1.*—150 parts of a Middle German lignite of a grain size of 0.5 to 2 mm. is pretreated with hydrochloric acid and then heated for 8 hours to 100° C. with 1000 parts of a solution of sodium sulfite of 5 per cent. strength and 150 parts of a formaldehyde solution of 30 per cent. strength. After separation from the liquor the product is washed with water, then with hydrochloric acid of 3.5 per cent. strength and again with water. When acting upon the lignite thus treated with a solution of calcium chloride of 5 per cent. strength, it takes up 1.24 per cent. CaO calculated on its own weight, while the lignite which only was treated with hydrochloric acid shows the capacity of 0.23 per cent. CaO.

*Example 2.*—100 parts of a disintegrated lignite pretreated with a caustic soda solution of 1 per cent. strength is heated together with 50 parts of sodium bisulfite and 50 parts of a formaldehyde solution of 30 per cent. strength and 900 parts of water in a closed vessel for 2 hours to 150° C. A cation-exchanging body is obtained which is suitable to be used in a neutral or acid medium. Even against a weakly ammoniacal solution it has a good stability. The capacity calculated on bound CaO is about 4 per cent. The stability against the action of ammoniacal liquids may be improved by after-treatment with 200 parts of a formaldehyde solution of 30 per cent. strength.

*Example 3.*—100 parts of a disintegrated lignite is pretreated with hydrochloric acid of about 15 to about 20 per cent. strength and then is heated together with 50 parts of sodium bisulfite, 250 parts of a formaldehyde solution of 30 per cent. strength and 750 parts of water in a closed vessel for 2 hours to 150° C. The cation-exchanging body thus obtained has the same properties as that described in the foregoing example. The capacity likewise is 4 per cent. CaO.

*Example 4.*—100 parts of lignite pretreated in a closed vessel with steam at 140 to 170° C. are heated with 50 parts of sodium bisulfite, 250 parts of a formaldehyde solution of 30 per cent. strength and 750 parts of water in a closed vessel for 2 hours to 150° C. The cation-exchanging body thus obtained has similar qualities as those described in Examples 2 and 3, but has an improved mechanical stability. Its capacity calculated on CaO is about 3.2 per cent.

*Example 5.*—100 parts of a disintegrated lignite is treated in a closed vessel at 170° C. with a solution of potassium chrome alum. Then this lignite is heated in an autoclave for 2 hours to 150° C. together with 50 parts of sodium bisulfite to 150 parts of a formaldehyde solution of 30 per cent. strength and 750 parts of water. The cation-exchanging body thus obtained has a capacity calculated on CaO of about 1.9, but has a very good stability against the action of ammoniacal liquors.

*Example 6.*—Disintegrated lignite is pretreated as pointed out in Example 4, in a closed vessel with steam at a temperature of 140 to 170° C. 100 parts of this lignite are heated for 2 hours to 150° C. in an autoclave with 50 parts of sodium bisulfite, 250 parts of acetaldehyde of 30 per cent. strength and 750 parts of water. The cation-exchanging body thus obtained has the same chemical properties as those obtainable according to Examples 2 and 3, but has a better mechanical stability. Its capacity calculated on CaO is about 3.1 per cent. A similar product with a somewhat better capacity (3.3 per cent. CaO) is obtained, when using 80 parts of paraformaldehyde and 900 parts of water instead of 250 parts of acetaldehyde of 30 per cent. strength and 750 parts of water.

Example 7.—Disintegrated lignite is pretreated with a caustic soda solution of 1 per cent. strength or with hydrochloric acid of 18 to 20 per cent. strength. 100 parts of this lignite are heated in a closed vessel with sodium bisulfite and acetaldehyde as indicated in Example 6. The capacity of this product calculated on CaO is about 4 per cent.

It is obvious that our invention is not limited to the foregoing examples or to the specific details given therein. Thus, for instance, instead of sodium bisulfite a mixture of neutral sulfite and of bisulfite may be used, whereat only care is to be taken that the treating liquor does not essentially surpass the neutral point and becomes distinctly alkaline. The temperature likewise may be varied and good results are obtainable when heating the reacting mixture to about 120° C. up to about 200° C. According to the examples given above, we use the bisulfite and the aldehyde in an excess over that required practically and thus, in fact, smaller proportions of the said materials may be used; since, however, the treating liquors may be used in a new process after addition of the consumed ingredients, no losses occur when working with the said excess. Instead of formaldehyde or acetaldehyde other aldehydes or compounds yielding an aldehyde during the reaction, may be used. We prefer, however, to carry out the reaction in the presence of formaldehyde, since it is the cheapest.

The sodium bisulfite or sulfite respectively indicated in the examples may be substituted by other water-soluble salts of sulfurous acid, thus as, for instance, the potassium or earth alkali metal salts. According to Example 5 the lignite may be pretreated with potassium chrome alum, however, other inorganic compounds having tanning properties such as, for instance, aluminum salts, may likewise be used for the purpose set forth.

What we claim is:

1. The process which comprises heating a humic substance of the group consisting of lignite and peat with a water-soluble salt of sulfurous acid of the group consisting of alkali metal sulfite, alkali metal and earth alkali metal bisulfites in the presence of water to a temperature between 100° C. to about 200° C., under non-alkaline conditions, and with an aldehyde of the group consisting of formaldehyde and acetaldehyde.

2. A process which comprises heating a humic substance of the group consisting of lignite and peat with an alkali metal salt of sulfurous acid in the presence of water to a temperature between 100° C. to about 200° C. under non-alkaline conditions, and with an aldehyde of the group consisting of formaldehyde and acetaldehyde.

3. The process which comprises heating a humic substance of the group consisting of lignite and peat with an alkali metal salt of sulfurous acid in the presence of water to a temperature between 100° C. to about 200° C. under non-alkaline conditions, and with formaldehyde.

4. The process which comprises heating a humic substance of the group consisting of lignite and peat with an alkali metal salt of sulfurous acid in a closed vessel to a temperature between about 120° C. to about 200° C. under non-alkaline conditions, and with formaldehyde.

5. The process which comprises heating a humic substance of the group consisting of lignite and peat pretreated with an inorganic tanning agent, with an alkali metal salt of sulfurous acid in a closed vessel to a temperature between about 120° C. to about 200° C. under non-alkaline conditions, and with formaldehyde.

6. The process which comprises heating lignite with sodium bisulfite and formaldehyde in a closed vessel to a temperature between about 120° C. to about 200° C.

7. The process which comprises heating a humic substance of the group consisting of lignite and peat pretreated with superheated steam, with an alkali metal salt of sulfurous acid in a closed vessel to a temperature between about 120° C. to about 200° C. under non-alkaline conditions, and with formaldehyde.

WALTHER SÜTTERLIN.
HANS WASSENEGGER.